Patented Oct. 27, 1953

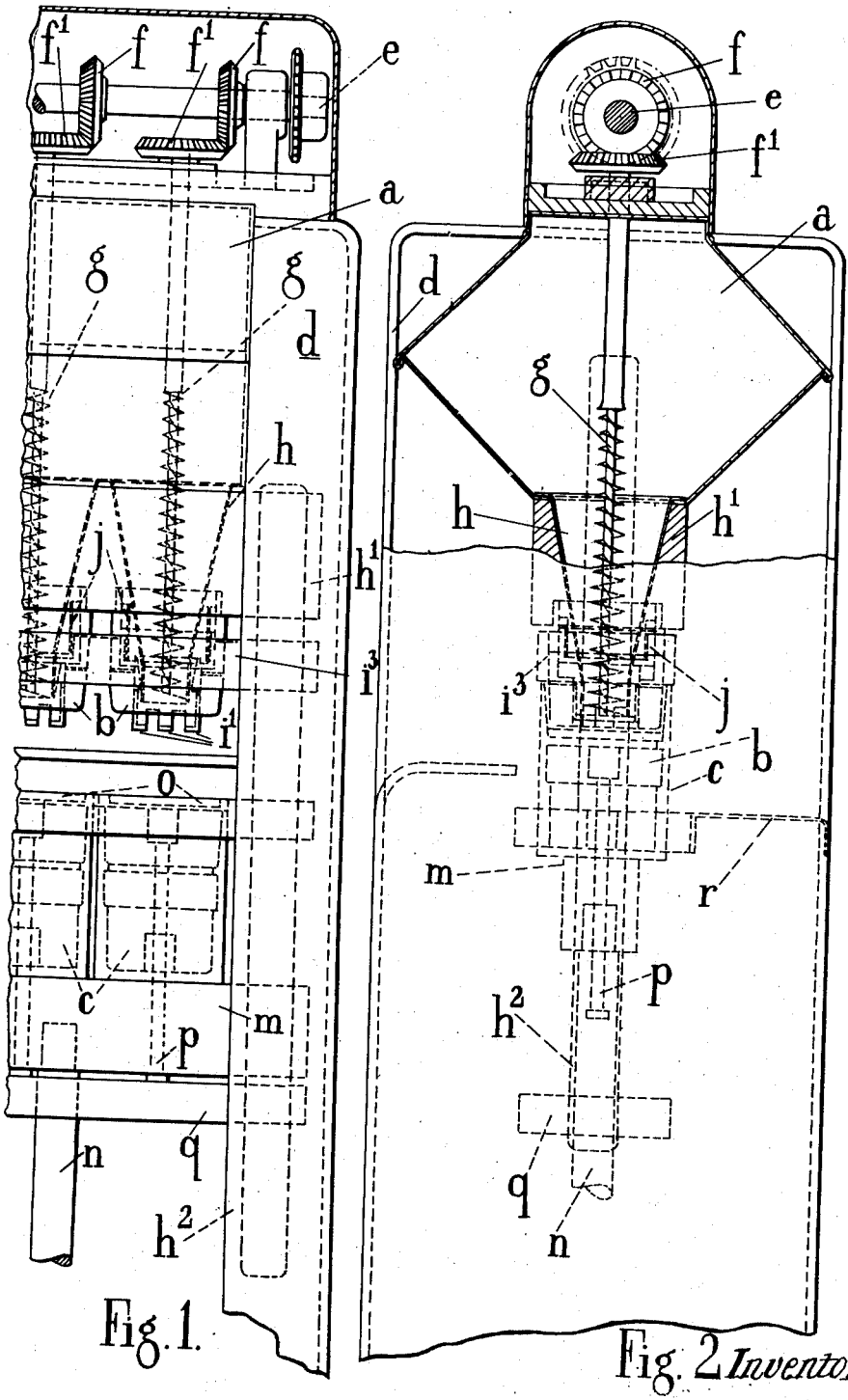

2,656,798

UNITED STATES PATENT OFFICE 2,656,798

AUTOMATIC MACHINE FOR MOLDING PIE SHELLS FROM DOUGH

Graeme Reid Mercer Miller, Stepps, Glasgow, Scotland

Application October 9, 1947, Serial No. 778,874
In Great Britain July 10, 1947

4 Claims. (Cl. 107—15)

This invention has reference to machines for moulding the shells or cases for meat pie, fruit tarts and the like, and has for its object to provide a machine for this purpose by which the dough surplus to each pie shell being moulded is automatically returned to form part of the dough to be used in making the next pie shell.

According to the present invention a machine for moulding the shells or cases for meat pies, fruit tarts and the like comprises one or more hollow male dies, means for feeding the dough to the interior thereof, means by which the dough so fed can be permitted to extrude to the exterior thereof, a co-operating female die for each male die, means for imparting a relative reciprocating movement to the male and female dies to mould the extruded dough therebetween, means which, prior to the completion of moulding operating seals the opening or openings through which the dough is extruded, opens a passage or passages to permit the return to the interior of the male die or dies of dough surplus to requirements, and which thereafter closes said passage or passages to trap between the dies the dough necessary for forming a shell or case, and means for ejecting the moulded shell or casing from the female die, or each female die, when the co-operating dies are separated.

A preferred embodiment of the invention will now be described with reference to the annexed drawings wherein:

Figure 1 is a front elevation of one end of the improved machine, the dies being shown in the open position.

Figure 2 is an end elevation thereof but showing the dies in the closed position.

Figure 3:
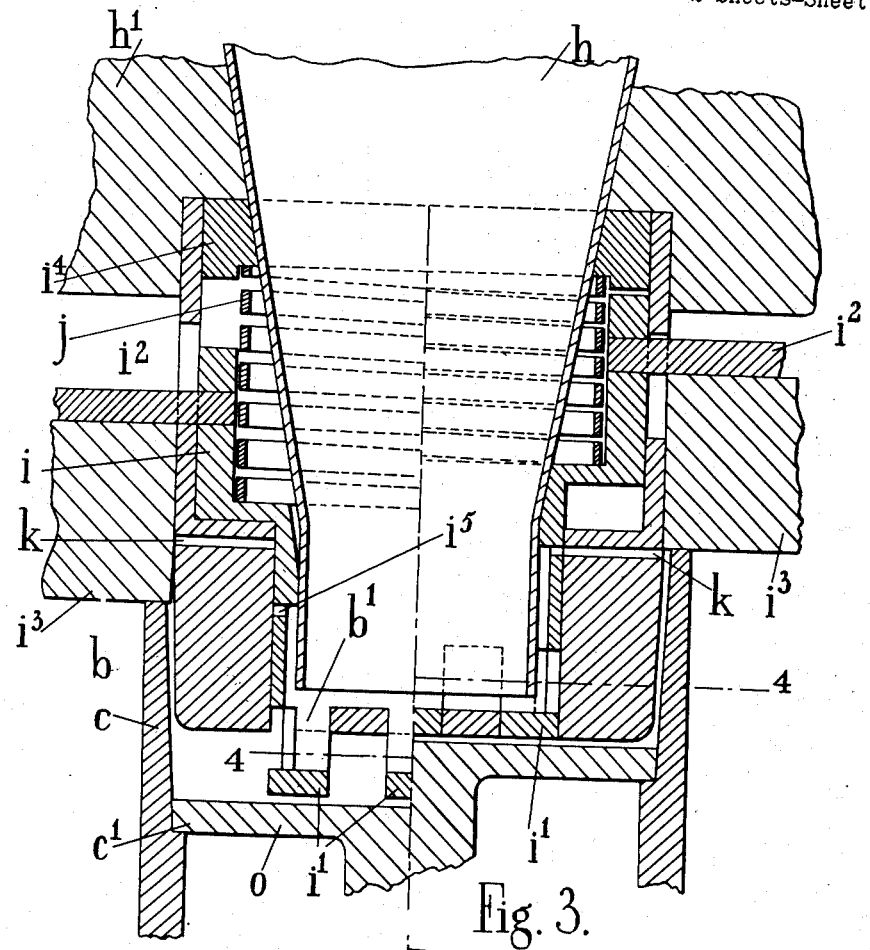
Figure 3 is a sectional elevation of a pair of co-operating male and female dies, the part on the left hand side of the vertical centre line showing the dies in the open position and the part on the right hand side thereof showing the dies when nearly in their closed position.
Figure 4:
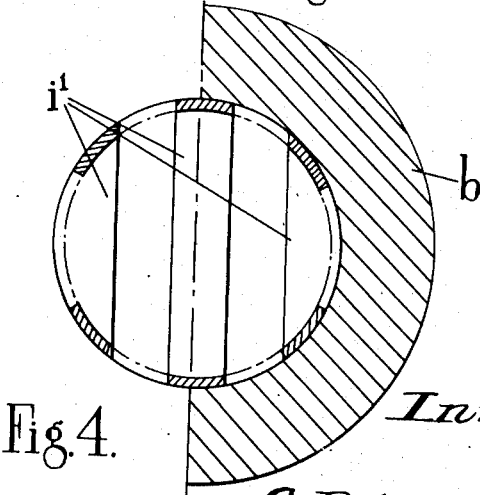
Figure 4 is a transverse section on the line 4—4, Figure 3.

In the drawings $a$ is a trough, $b$ the hollow male dies and $c$ the female dies, all supported by a frame or casing $d$. There may be any desired number of aligned male and female dies the number depending on the desired output and the frame or casing is of a corresponding length. The trough, which may be detachable, extends substantially the length of the frame or casing.

Extending from end to end of the upper part of the machine is a driving shaft $e$ which through bevel gearing $f$ and $f^1$ drives a series of vertical feed worms $g$. Each worm extends through the trough $a$, and a hopper $h$ which terminates in the interior of a male die $b$. The hoppers $h$ are carried by a supporting bar $h^1$ which is secured to the frame or casing. The upper ends of vertical end guide rods $h^2$ pass freely through said bars $h^1$. The bottom of each male die is provided with a number of through slots $b^1$ which can be closed by grid bars $i^1$ carried by an inner sleeve $i$. Said sleeves, which fit within the male dies, are carried by tongue plates $i^2$ which in turn are carried by a bar $i^3$ extending from end to end of the machine and loosely fitted on the end guide rods $h^2$. The bar $i^3$ is provided with a series of aligned cylindrical openings in which the male dies are fitted. Helical springs $j$ bear on said sleeves and on thrust rings $i^4$ at the upper ends of the male dies and urge the sleeve downwards.

The annular wall of each male die is provided with a number of circumferentially arranged through slots $k$ by which the interior thereof is placed in communication with the exterior, said slots being level with the top of the shell or case to be formed by the dies as hereafter explained. The sleeves are provided with slots $i^5$ which can register with the slots $k$.

The female dies are carried by a bar $m$ likewise extending from end to end of the machine and to which the rods $h^2$ are secured, a vertical reciprocating vertical movement being imparted to the bar $m$ and the dies carried thereby by means of a rod $n$ operated by a crank, cam or other suitable mechanism. The bottom $o$ of each female die is capable of a relative vertical movement and carries a downwardly extending stem $p$, said stems being arranged to co-operate with a fixed cross bar $q$ extending from end to end of the machine. A delivery table $r$ is provided to receive the moulded shells or cases and if desired a conveyor may be provided to receive the moulded shells or cases.

The dies, both male and female, are electrically heated as is common practice in hand operated machines for moulding dough to form shells or cases for meat pies, fruit tarts and the like.

In describing the operation of the machine it will be assumed that the dies are in the open position as shown in Figure 1 and the left hand side of Figure 3 and further it will be assumed that the trough is filled with dough.

The driving shaft $e$ through the bevel gearing drives the worms $g$ so that the dough is fed to the interior of each male die $b$ and is extruded through the slots $b^1$ to adhere to the underside of said dies. The bar $m$ is then moved upwards and carries with same the dies c, the bottoms o of the dies being picked up by the internal annular ribs $c^1$ of the dies. As the female dies move upwards they co-operate with the bar $i^3$ and thereby raise the sleeve $i$ carrying the grid bars $i^1$ so that the latter seal the slots $b^1$ in the bottoms of the male dies. Further the dough in excess of requirements trapped between the dies is then forced through the slots $k$ and slots $i^5$ registering therewith into the interior of the male dies. Thereafter said slots $k$ are sealed off by the further upward movement of the sleeves so that the trapped extruded dough is moulded to the shape defined by the space separating the female from the male dies. Thereafter the bar $m$ is moved downwards carrying with it the female dies with the moulded shells or casings therein. The stems $p$ contact with the fixed cross bar $q$ so that the further downward movement of the bottoms of the female dies is arrested. This occurs when the bottom of the shells or casings are substantially at the same level as the table. The female dies however continue their downward movement until their upper ends are slightly below the bottom carrying the shells or casings. The shells or casings can then be pushed on to the table or carried by the conveyor and the female dies, which have now reached their initial position, are ready to commence their upward movement to repeat the aforesaid cycle of operations.

The downward movement of the sleeves $i$ is effected by the helical compression springs $j$ which are placed under compression during the upward movement of the sleeves.

The rotation of the feed worms is not continuous, but is intermittent, their rotation synchronizing with the opening to the closing of the slots in the bottoms of the male dies.

I claim:

1. A machine for moulding pie shells embodying at least one hollow male die of a formation corresponding to the interior of the pie shell to be moulded, the base of said die having at least one through slot therein and the wall being also provided with a through slot therein, a sleeve slidable within said die to uncover and cover the slot in its base and to cover and uncover the inner end of the said slot in the wall, a female die of a formation corresponding to the exterior of the mould, feed means by which dough fed to the interior of the male die is extruded through the slot in its base when uncovered, and means to move the female die and the sleeve with respect to the male die so that the slot in the base of the male die is sealed, the extruded dough moulded between the dies to form the pie shell and the surplus extruded dough returned to the interior of the male die through the slot in the wall thereof.

2. A machine for moulding pie shells embodying at least one hollow male die of a formation corresponding to the interior of the pie shell to be moulded, the base of said die having at least one through slot therein and the wall thereof also provided with at least one through slot therein, a sleeve slidable within said die to uncover and cover the slot in its base and to cover and uncover the inner end of the said slot in the wall, spring means by which the sleeve is urged downwards so that the slot in the base of the die is normally open, a female die of a formation corresponding to the exterior of the mould, feed means by which dough fed to the interior of the male die is extruded through the slot in its base when uncovered, and means to move the female die and the spring loaded sleeve with respect to the male die so that the slot in the base of the male die is sealed, the extruded dough moulded between the dies to form the pie shell and the surplus extruded dough returned to the interior of the male die through the slot in the wall thereof.

3. A machine for moulding pie shells embodying at least one hollow male die of a formation corresponding to the interior of the pie shell to be moulded, the base of said die having at least one through slot therein and the wall thereof also provided with at least one through slot therein, a sleeve slidable within said die to uncover and cover the slot in its base and to cover and uncover the inner end of the said slot in the wall, spring means by which the sleeve is urged downwards so that the slot in the die is normally open, a female die of a formation corresponding to the exterior of the mould, said female die having a base with downwardly extending stem and capable of a vertical movement relative to the wall of the die, a fixture to co-operate with said stem, feed means by which dough fed to the interior of the male die is extruded through the slot in its base when uncovered, and means to move the female die and the spring loaded sleeve with respect to the male die so that the slot in the base of the male die is sealed, the extruded dough moulded between the dies to form the pie shell and the surplus extruded dough returned to the interior of the male die through the slot in the wall thereof, the co-operation of the stem with the fixture on the return movement of the female die arresting the movements of the base of said die to eject the pie shell.

4. A machine for moulding pie shells embodying at least one hollow male die of a formation corresponding to the interior of the pie shell to be moulded, said die having a through slot in the base thereof and also a through slot in the wall thereof, means by which dough can be forced through said slot in the base, a female die of a formation corresponding to the exterior of the mould, means to move the dies into mating engagement and thereafter move them apart and means by which the slot in the base of the male die is closed and the said slot in the wall thereof opened when the dies are moved into mating engagement so that the dough is trapped between and moulded by the dies and the excess dough returned through said slot in the wall of the male die to the interior of the male die to form part of the dough subsequently extruded through said die to form the next pie shell.

GRAEME REID MERCER MILLER.

References Cited in the file of this patent

UNITED STATES PATENTS

| Number | Name | Date |
|---|---|---|
| 898,473 | Jackson | Sept. 15, 1908 |
| 1,677,808 | Alassio et al. | July 17, 1928 |
| 1,836,752 | Goodwin | Dec. 15, 1931 |
| 1,865,464 | Geyer | July 5, 1932 |
| 2,015,001 | Bishop | Sept. 17, 1935 |
| 2,329,239 | Banigan | Sept. 14, 1943 |
| 2,351,582 | Bohrer | June 20, 1944 |